Nov. 14, 1961  W. S. KREISMAN  3,008,374
ELECTROMAGNETICALLY OPERATED LIGHT VALVE
Filed Nov. 16, 1960  2 Sheets-Sheet 1

INVENTOR.
WALLACE S. KREISMAN
BY
ATTORNEYS

Nov. 14, 1961  W. S. KREISMAN  3,008,374
ELECTROMAGNETICALLY OPERATED LIGHT VALVE
Filed Nov. 16, 1960  2 Sheets-Sheet 2

INVENTOR.
WALLACE S. KREISMAN
BY
ATTORNEYS

United States Patent Office 3,008,374
Patented Nov. 14, 1961

3,008,374
ELECTROMAGNETICALLY OPERATED
LIGHT VALVE
Wallace S. Kreisman, Malden, Mass., assignor to the United States of America as represented by the Secretary of the Air Force
Filed Nov. 16, 1960, Ser. No. 69,777
9 Claims. (Cl. 88—61)

This invention relates to an electrically controlled camera shutter and, more particularly, to a camera shutter which operates by moving a film of liquid metal in response to an electrical signal, thereby allowing light waves to enter the camera lens.

Heretofore, it has been customary to provide electrically operated cameras with metal shutters which are actuated by means of a solenoid acting through an armature on the shutter blades. This movement is usually transmitted through various gears and linkage arrangements. A relatively complicated structural system reresults which is often unreliable particularly with regard to the timing and synchronizing phases of operation. The unreliability of electrical shutters which employ extensive mechanical linkages is due primarily to the mechanical play or lag inherently present in this type of system causing unpredictable results and relative slowness in action.

The shutter described below overcomes many of these drawbacks. None of the objectionable mechanical elements are present to cause lag and play, thereby eliminating this problem. Instead, a relatively simple structural arrangement which operates to move a film of liquid-metal in response to an electrical signal provides shuttering action to allow or prevent the passage of light through the shutter.

Accordingly, it is an object of the present invention to provide a camera which operates accurately over a predetermined time interval.

Another object of the invention is to provide an electrically operated camera shutter which responds instantaneously to a signal from a remotely located source.

A further object of the invention is to provide a camera shutter which can be easily regulated by simple adjustment of certain of its electrical components.

A still further object of the invention is to provide a camera shutter which does not include extensive gears and mechanical links, thereby allowing more accurate synchronization of the shutter with other camera apparatus.

Still another object of the invention is to provide an electrical camera shutter which utilizes the electrically conducting properties of a liquid-metal element in its operation.

These and other objects, features, and advantages will become more apparent from the following description taken in connection with the illustrative embodiment in the accompanying drawings, wherein.

Figure 1:
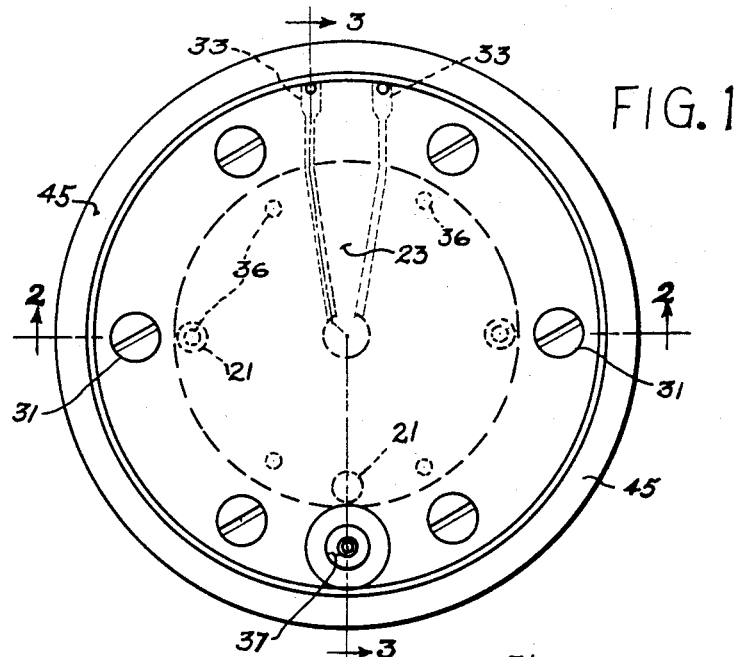
FIGURE 1 is a top plan view of the camera shutter according to the present invention.
Figure 2:
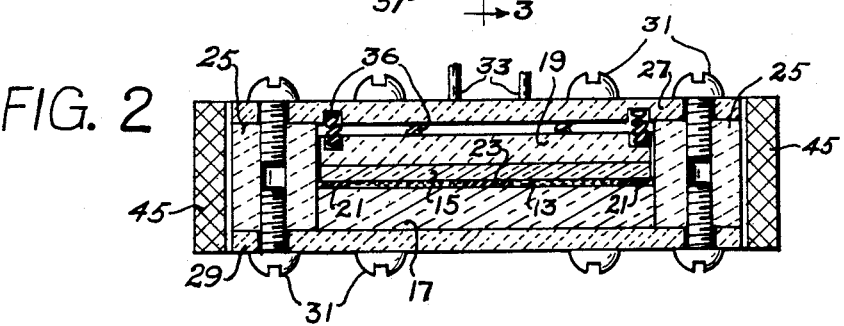
FIGURE 2 is a sectional view taken along the line 2—2 of FIGURE 1.
Figure 3:
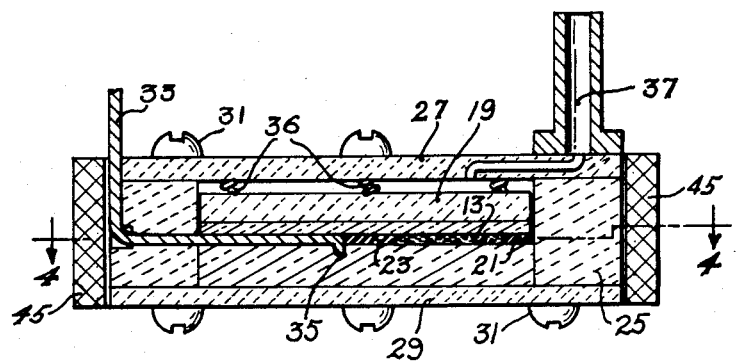
FIGURE 3 is a sectional view taken along the line 3—3 of FIGURE 1.

Referring to the drawings, there are shown top and sectional views of the camera shutter according to the invention. The device consists essentially of a thin film of mercury disposed between an upper glass plate 15 and a lower glass plate 17. The upper glass plate 15 is attached with transparent cement to a lucite disc 19. The glass plates 15 and 17 are spaced apart by three rubber discs 21 and by a fourth opaque insulator 23 which is shaped somewhat like a keyhole and extends from the center to the outer edge of the glass discs.

An annular lucite ring 25 serves as a cylinder in which the above described assembly is located. The upper glass plate 15 with the attached lucite disc 19 is slidably positioned in the upper part of the cylinder while the lower glass plate 17 fits tightly in the lower part of the cylinder. Top and bottom lucite cover plates 27 and 29, respectively, are attached to the lucite ring 25 by the screws 31. The lower glass plate is cemented to the bottom lucite cover plate 29 with transparent cement.

A pair of metal electrodes 33 pass through the lucite housing ring 25 and are cemented to each side of the keyhole insulator 23. The ends of the electrodes 33 are bent downward at a 90 degree angle to terminate in two blind holes 35 provided near the center of the lower glass plate 17. Each of the rubber discs 21, as well as the keyhole insulator 23, is cemented to the surface of the lower glass plate 17. The discs 21 serve to regulate to thickness of the mercury film 13, and the keyhole insulator 23 serves to prevent short circuiting of the electrodes 33 by keeping the liquid-metal from filling the wedge-shaped area between them.

A series of helical springs 36 operate to urge the upper glass plate 15 with the lucite disc 19 attached thereto downward against the rubber discs 21. In order to avoid working against atmospheric pressure when moving the fluid, evacuated means (not shown), in conjunction with a passageway 37, are provided for lowering the pressure of the interior of the shutter assembly above the upper glass plate 15.

Figure 4:
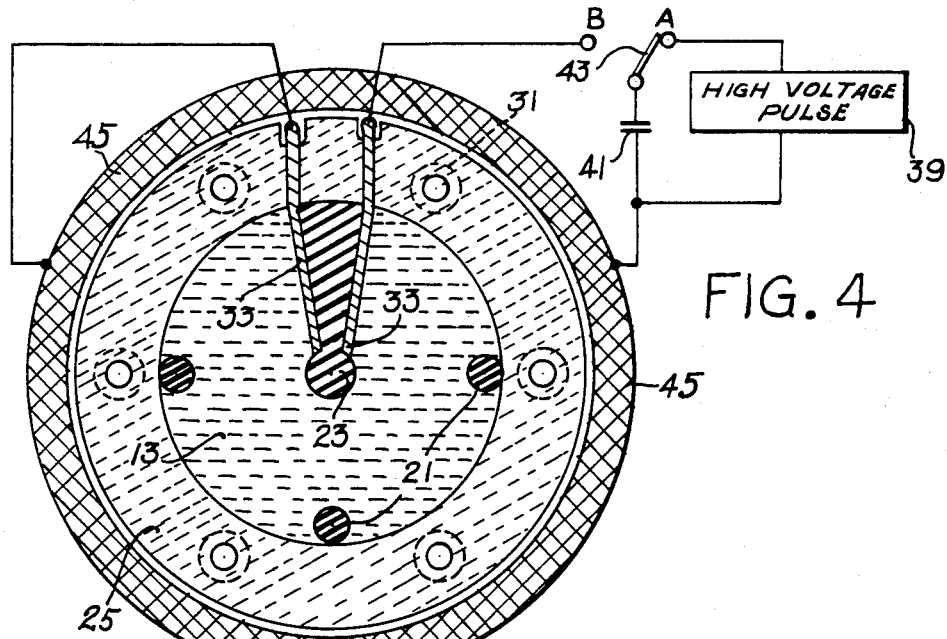
FIGURE 4 is a schematic top plan view of the camera shutter in the closed position with the cover plate and piston removed, showing the liquid-metal dispersed across the lower plates.
Figure 5:
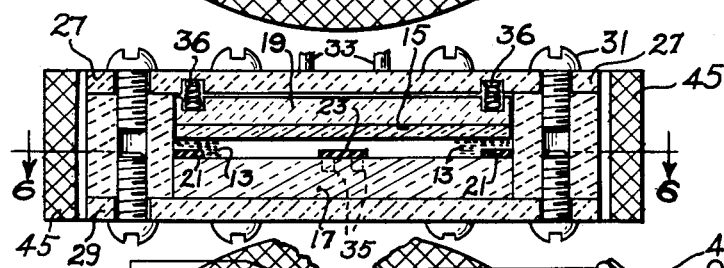
FIGURE 5 is a sectional view of the shutter in the open position.
Figure 6:
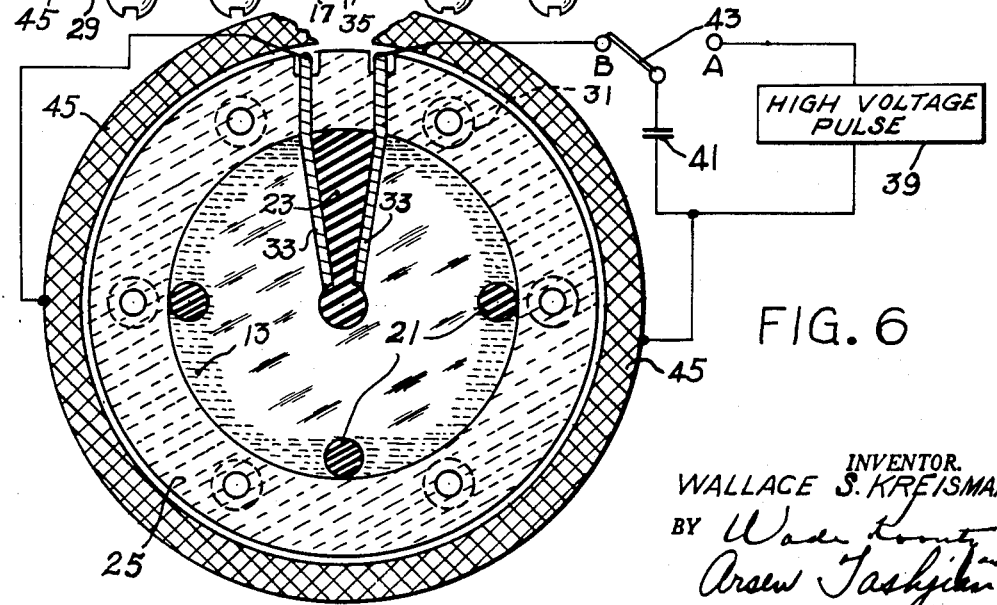
FIGURE 6 is a top plan schematic view of the shutter in the open position taken along the line 6—6 of FIGUDE 5.

In FIGURE 4, there is shown a schematic diagram of the wiring arrangement. A high voltage source 39 is connected in series with an electrolysis condenser 41. A two-way switch 43 provided with positions A and B is also included in series with the condenser 41 and the high voltage source 39. When the switch 43 is in position A, the electrolytic condenser 41 becomes charged.

A magnetic field coil 45 is wound around the annular lucite ring. One end of the coil 45 is common with one of the electrodes 33. The other end of the coil 45 is connected to the condenser 41. By changing the switch 43 to position B, the condenser 41 is discharged through the coil 45 and the electrodes 33 in series, thereby causing the mercury to move. Depending on the relative direction of the current flow and the magnetic field, the electromagnetic force on the mercury film 13 acts either radially inward or outward. The shutter is opened by moving the mercury film outward away from the center of the shutter.

The shutter operates by first placing switch 43 in position A, thereby charging condenser 41. Switch 43 is then placed in position B, causing the charged condenser 41 to discharge through the coil 45, creating a magnetic field at the shutter normal to the plane of the mercury film 13. The discharging condenser also sends a pulse current through the electrodes 33 and into the mercury film. When the electromagnetic force acting on the mercury film is directed radially outward, the open inner radius of the mercury moves outward, thereby urging the upper glass plate 15 with the attached lucite disc 19 upward. Since the area above the glass plate 15 has been partially evacuated, only the forces exerted by the springs 36 need to be overcome in the upward movement of the glass plate 15. After the condenser 41 has discharged and the effect of the electromagnetic forces thereby removed, the helical springs 36 urge the upper glass plate 15 downward, resulting in the reformation of the mercury film over the area between the glass plates and returning the shutter to its normal closed or light-blocking position.

As described above, the driving circuit that sends current through the liquid-metal and at the same time creates a magnetic field, includes a charged condenser that is permitted to discharge through the liquid-metal and through a magnetic field coil placed in series. The time constant of discharge, governed by the capacitance of the condenser and the inductance of the coil, determines the speed of the shuttering action. Also, provisions may be made for reversing current flow in the circuit to cause the mercury to return more quickly to normal position under the influence of the reversed electromagnetic force.

It is obvious that certain modifications and variations may be made in the construction and size of the elements, as well as the material used, without departing from the spirit and scope of the invention as described in the appended claims. For example, although the description of the invention has been directed toward mercury as the liquid-metal element, other materials such as gallium, sodium potassium, and various alloys of these elements may be adapted for use as the liquid-metal element. Even non-metallic, opaque, electrically conductive liquids, as for example, an opaque electrolyte solution capable of conducting a current may be used as the moving element. Also, it should be understood that the electrical circuit shown is merely descriptive of one preferable means for accomplishing the desired result. Other means such as two power sources, one for creating the magnetic field and the other for charging the condenser is another way of operating the shutter.

Having thus described my invention, what I claim as new and desire to secure by Letters Patent of the United States is:

1. An electromagnetic light valve for use as a camera shutter comprising a layer of opaque liquid-metal disposed between a pair of transparent plate members, one of said plate members being axially movable, the other of said plate members being fixed, and electromagnetic means for moving said layer of liquid-metal toward the outer periphery of said plates to produce an area remote from said periphery which is free from said metal to allow passage of light through said shutter, said axially movable transparent plate member moving away from said fixed plate member to allow said layer of liquid-metal to change in thickness.

2. The light valve defined in claim 1, wherein said electromagnetic means for moving said layer of liquid-metal includes a source of electrical energy, a condenser serially connected to said source to be charged therefrom, a coil disposed around said layer of liquid-metal for creating a magnetic field normal thereto, and a pair of electrodes forming the boundaries of said layer of liquid metal, said coil and electrodes being in series with each other and with said condenser such that the charge from said condenser passes through said coil and said electrodes and into said layer of liquid-metal.

3. An electromagnetic camera shutter comprising a pair of transparent plate members, an annular ring disposed around said plate members, one of said plate members being axially movable within said annular ring, the other of said plate members being fixed in relation to said annular ring, a layer of opaque, electrically conductive, liquid material disposed between said transparent plate members, and electrical means for moving said opaque material outward to allow passage of light through said shutter, said axially movable plate member moving away from said fixed plate member to allow said layer of liquid material to change in thickness.

4. The shutter described in claim 3 wherein said opaque, electrically conductive, liquid material comprises a film of liquid mercury.

5. The shutter described in claim 3, wherein the area into which said movable transparent plate moves is partially evacuated to prevent pressure accumulation and reduce the amount of energy necessary for operating the shutter.

6. The shutter described in claim 3, wherein biasing means are provided for returning said movable plate member to its normal position, thereby restoring said opaque layer to light-blocking status.

7. The electromagnetic shutter described in claim 3, wherein said layer of opaque material is urged inward by reversing the direction of current flow to restore said layer of opaque material to normal light-blocking status.

8. An electromagnetic light valve comprising a pair of transparent circular plate members in parallel spaced relation to each other, an annular ring in which said circular plates are disposed, one of said plates being axially movable within said annular ring, the other of said plate members being fixed in relation to said annular ring, a plurality of rubber-like spacers attached to said fixed plate holding said movable plate in spaced relation therefrom, a layer of opaque, electrically conductive liquid material disposed between said transparent plates to prevent the passage of light through said shutter, and electrical means for moving said opaque layer from light-blocking position including a source of electrical energy, a condenser serially connected to said source to be charged therefrom, a coil disposed adjacent to and around the periphery of said layer of opaque material for creating a magnetic field normal thereto, and a pair of electrodes passing through said layer of opaque material, said coil and electrodes being in series with each other and with said condenser such that the charge from said condenser passes through said coil and said electrodes causing said layer of opaque material to move from light-blocking position.

9. The electromagnetic light valve defined in claim 8, wherein one of said plurality of rubber-like spacers is in the form of a keyhole and acts to separate and insulate the electrodes from each other such that the electrical charge entering one of said electrodes must pass through the layer of opaque material in order to reach the other electrode and complete an electrical circuit.

References Cited in the file of this patent

UNITED STATES PATENTS

| | | |
|---|---|---|
| 2,571,894 | Kennelly | Oct. 16, 1951 |
| 2,596,566 | Lacy et al. | May 13, 1952 |